Patented Oct. 14, 1952

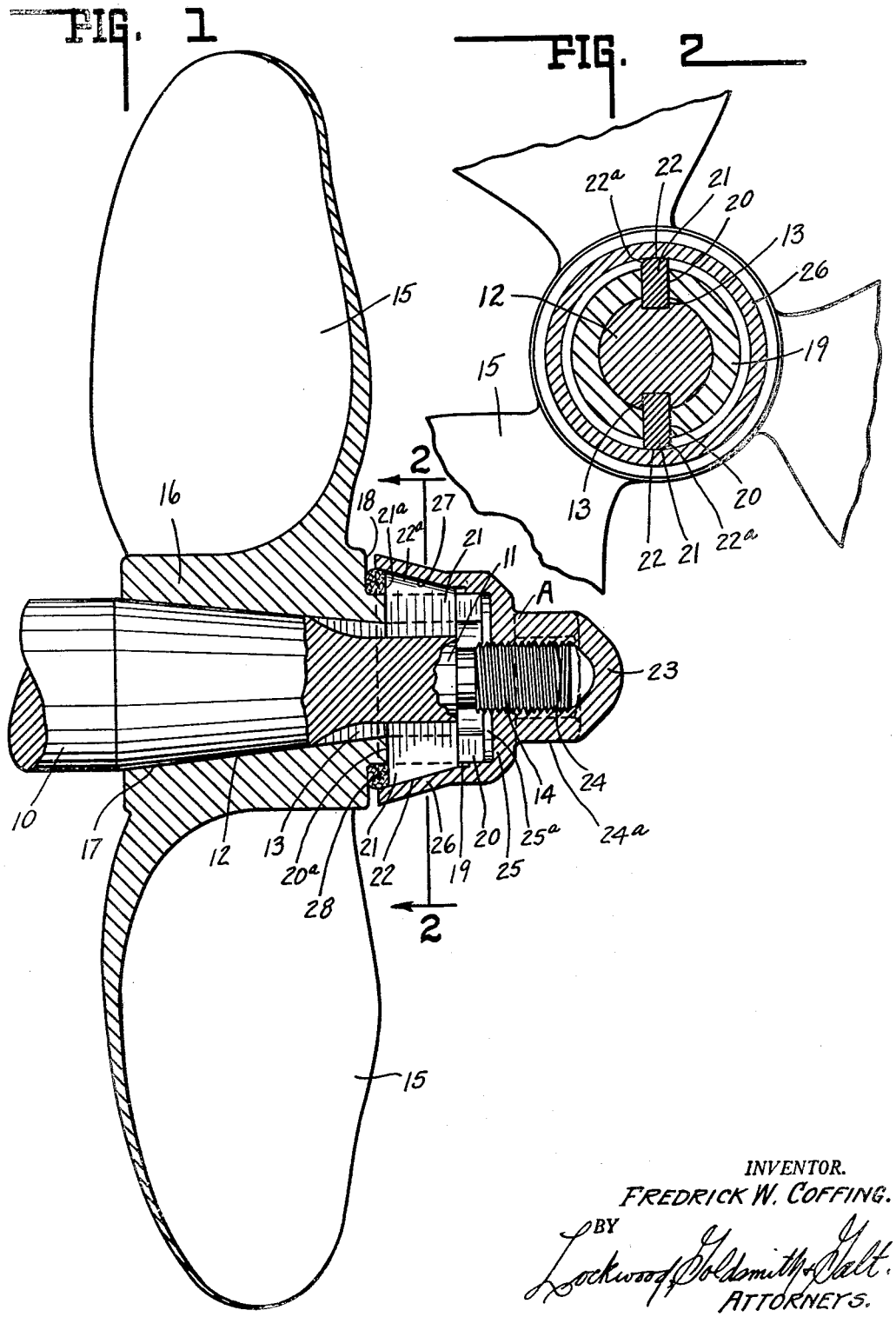

2,613,967

UNITED STATES PATENT OFFICE 2,613,967

OUTBOARD MOUNTING STRUCTURE

Fredrick W. Coffing, Danville, Ill., assignor to Coffing Hoist Company, Danville, Ill., a corporation Application March 18, 1949, Serial No. 82,180

5 Claims. (Cl. 287—53)

This invention relates to an outboard mounting structure adapted to interlock a driven member such as a propeller, and a driving member such as a propeller shaft.

The object of the invention is to provide retention of the driven member such as a propeller upon the driving member such as a propeller shaft, which retention is of a protected, self-adjusting and driving character.

One feature of the invention resides in the key wedging, enveloping, and self-locking stop nut structure and associated parts.

Another feature, when utilized, resides in the seal structure, and other objects and features of the invention will be set forth more specifically hereinafter.

The full nature of the invention will be understood from the accompanying drawings and the following description and claims:

In the drawings Fig. 1 is a longitudinal central sectional view of the invention, a portion of the supporting and driving shaft being shown in elevation.

Fig. 2 is a transverse sectional view taken on line 2—2 of Fig. 1 and in the direction of the arrows.

In Fig. 1, 10 indicates a driving and supporting shaft. It includes a tapered or frusto conical hub supporting portion 12. The latter is cylindrically elongated as at 11 and it includes a plurality of equal arcuately spaced, longitudinally disposed, elongated keyways 13. The shaft free end is threaded at 14 and this is of reduced diameter relative to portion 11.

A propeller having blades 15 includes hub portion 16 having a rearward face 18 for a purpose to be described. It also includes a frusto-conical bore 17. The hub is elongated rearwardly as at 19 and this portion includes complementary slots 20 therethrough which match the keyways 13.

Disposed in each keyway 13 is a key 21 of wedge face type. This key seats in the registering slot 20 and projects radially outward beyond same. The outer or top face 22 of each key is tapered to slope rearwardly or toward the free end of the slot. For a right hand thread the trailing edge or corner 22ª, see Fig. 2, is "knocked" off, rounded or beveled for the purpose hereinafter more specifically described.

The cap type stop and lock nut A includes a closed end portion 23, the internally threaded portion 24, shoulder portion 25 and skirt portion 26. The latter has an internal tapered frusto-conical surface 27 riding the tapered faces 22 of keys 21 as the cap nut is screwed home.

The propeller is driven onto the shaft until hub bore 17 wedges upon shaft frusto-conical portion 12 if the two have not been so disposed initially. Then as the cap nut is threaded in the locking up direction, the skirt initially slides the several keys into slots 20 until the ends 21ª engage the walls 20ª of said slots. Continued locking up threading action then wedges the skirt 26 and key wedges 21 together. Such threading is accomplished with a wrench. Preferably the nut exterior portion 24ª is polygonal is outline for tool accommodation. Also the nut is preferably streamlined as illustrated.

As above noted, each of the keys 21 has one of its outer or top faces 22 rounded or beveled as indicated at 22ª, along the trailing edge thereof over which the skirt portion of the nut advances upon being screwed into locking position. The opposite or advance edge of the key remains relatively sharp, as illustrated, over which the skirt of the nut advances when being backed off from locking position. This arrangement is such that the skirt may readily slide over the rounded or beveled edge to facilitate its rotation into locking position; but upon being backed off, its rotation will be resisted by the normally sharp edge of the key wedging or digging into the surface of the skirt portion 26. Thus, there results in effect a self-locking of the nut which resists movement in a backing off direction such as to prevent its becoming loosened through vibration, requiring no lock washer or similar device for holding it.

The keys 21 are of such length that the shaft keyway and hub slotted portions project beyond the keys. The nut A includes a counterbore 25ª that slidably seats upon this projecting portion of the hub and prevents hub splitting.

The ends 20ª of slots 20 limit the longitudinal movement of keys 21. These keys provide a trap for O-ring 28 bearing upon face or shoulder 18 adjacent portion 19. Since the skirt 26 is tapered internally as at 27, when the nut is tightened home the O-ring 28, trapped as aforesaid, seals the internal structure enclosed by the skirted nut.

While the shaft and hub bore are illustrated as tapered, they may be cylindrical but in that event there must be provided a stop shoulder or collar on the shaft.

While the invention has been set forth in great detail in the foregoing description, same is to be considered as illustrative only, and the several modifications that will readily occur to persons skilled in the art, as well as those herein specified, are all considered to be within the scope of this invention, reference being had to the appended claims.

The invention claimed is:

1. An outboard type mounting structure having a shaft member and another member with a hub disposed thereon, the two members having limited relative axial movement for initial mounting, in combination, a shaft extension on said shaft member having longitudinally extending keyways formed therein and a threaded extension beyond said keyways, the hub member having an extension provided with slots coinciding with said keyways, keys extending through said slots and bottomed in said keyways and having rearwardly tapering top edges, and a threaded nut having a frusto-conical skirt threaded upon said threaded extension with the skirt wedgingly engaging the tapering edges of the keys to effect a wedging engagement of the keys between the bottom of the keyways and the frusto-conical skirt.

2. An outboard type mounting structure having a shaft member and another member with a hub disposed thereon, the two members having limited relative axial movement for initial mounting, in combination, a shaft extension on said shaft member having longitudinally extending keyways formed therein and a threaded extension beyond said keyways, the hub member having an extension provided with slots coinciding with said keyways, keys extending through said slots and bottomed in said keyways and having rearwardly tapering top edges, and a threaded nut having a frusto-conical skirt threaded upon said threaded extension with the skirt wedgingly engaging the tapering edges of the keys to effect a wedging engagement of the keys between the bottom of the keyways and the frusto-conical skirt, and an O-ring surrounding said shaft extension and engaged by said frusto-conical skirt.

3. An outboard motor type mounting structure having a shaft member and another member with a hub disposed thereon, the two members having limited relative axial movement for initial mounting, in combination, a shaft extension on said shaft member having longitudinally extending keyways formed therein and a threaded extension beyond said keyways, the hub member having an extension provided with slots coinciding with said keyways, keys extending through said slots and bottomed in said keyways having rearwardly tapering flat top surfaces, the edges of the respective top surfaces being substantially rounded on one side thereof and relatively sharp on the opposite side thereof, and a threaded nut having a frusto-conical skirt threaded upon said threaded extension in a direction to advance over the rounded edges of said keys into wedging engagement therewith, the relatively sharp edges of said keys engaging the skirt to resist unthreading thereof.

4. An outboard type mounting structure including a driving member and a driven member mounted thereon against axial displacement, in combination, an extension on the driving member having longitudinally extending keyways formed therein with a threaded extension beyond said keyways, and a corresponding extension on said driven member provided with slots coinciding with said keyways, keys extending through said slots and bottomed in said keyways and having rearwardly tapering top edges sloping toward said threaded extension, and a threaded nut having a frusto-conical skirt threaded upon said threaded extension with the skirt wedgingly engaging the tapering edges of the keys to effect wedging engagement of the keys between the bottom of the keyways and the frusto-conical skirt.

5. An outboard type mounting structure including a driving member and a driven member mounted thereon against axial displacement, in combination, an extension on the driving member having longitudinally extending keyways formed therein with a threaded extension beyond said keyways, and a corresponding extension on said driven member provided with slots coinciding with said keyways, keys extending through said slots and bottomed in said keyways and having rearwardly tapering flat top surfaces, one edge of said surfaces being substantially round and the opposite edge thereof relatively sharp, and a threaded nut having a frusto-conical skirt threaded upon said threaded extension in a direction to advance over the rounded edges of said keys into skirt wedging engagement therewith, engagement of said skirt over the relatively sharp edges of said keys resisting movement thereof in the unthreading direction.

FREDRICK W. COFFING.

REFERENCES CITED

The following references are of record in the file of this patent:

UNITED STATES PATENTS

| Number | Name | Date |
| --- | --- | --- |
| 582,750 | Leaycraft | May 18, 1897 |
| 1,116,095 | Mellis | Nov. 3, 1914 |
| 1,395,913 | Ford | Nov. 1, 1921 |
| 2,170,352 | Schaefer | Aug. 22, 1939 |
| 2,190,371 | Taylor | Feb. 13, 1940 |
| 2,259,643 | Jones | Oct. 21, 1941 |